Oct. 18, 1960     S. P. KINNEY ET AL     2,956,683
WATER STRAINER
Filed Feb. 1, 1957     2 Sheets-Sheet 2

United States Patent Office 2,956,683
Patented Oct. 18, 1960

2,956,683
WATER STRAINER

Selwyne P. Kinney, Cornelius J. Garrigan, Ward W. Clarke, James S. Fuhs, and George Kukich, Pittsburgh, Pa., assignors to S. P. Kinney Engineers, Inc., Carnegie, Pa., a corporation of Pennsylvania Filed Feb. 1, 1957, Ser. No. 637,685

2 Claims. (Cl. 210—330)

This invention relates to rotary drum strainers and is for an improvement in strainers of the type disclosed in Patent No. 2,371,760 of March 20, 1945, to Selwyne P. Kinney, and this application constitutes a continuation-in-part of our application Serial No. 248,374, filed September 26, 1951, now abandoned.

Rotary drum strainers of the type referred to are used industrially to remove solids from liquids, most frequently being employed where water for industrial purposes is drawn from streams and rivers, although they find many other useful applications.

They comprise a casing having inlet and outlet connections which are opposite one another to permit the strainer to be placed in a straight pipe line without bends or elbows being required. Inside the casing is a rotary drum which may be either a cylinder, or which may be of inverted frusto-conical form mounted on a vertical shaft for rotation inside the casing, there being a space between the exterior of the drum and the casing which is filled by the incoming water. The drum has many holes through its periphery in which are removable strainer elements so that the water may flow through these strainers into the interior of the drum. At one point in the casing there is a reverse flush shoe bearing against the periphery of the drum that allows the water inside the drum to flow outwardly through the screens and clean away sediment that has been strained out of the water. In this way as the drum rotates the straining media are brought opposite the shoe and thereby kept free of material that lodges against them. The bottom of the casing is formed with a vertical partition or well in which the bottom of the drum has a close fit, and the strained water from the interior of the drum, other than that small portion used for backwashing the screens, is removed from this well or chamber enclosed within the wall.

An object of the present invention is to provide an improved strainer of this type so constructed as to substantially reduce the overall height of a strainer of a given capacity without increasing the pressure drop across the strainer.

A further object of the invention is to provide an improved strainer of this type in which a shorter length of unsupported shaft may be used for a given capacity.

A further object of the invention is to provide a strainer of improved construction which is more economical to build and easier to maintain.

Our invention may be more fully understood by reference to the accompanying drawings, in which.

Figure 2:
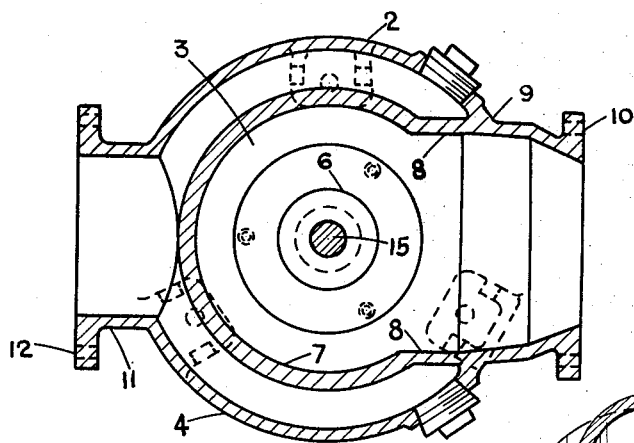
Fig. 2 is a horizontal section on a smaller scale in the plane of line II—II of Fig. 1.
Figure 5:
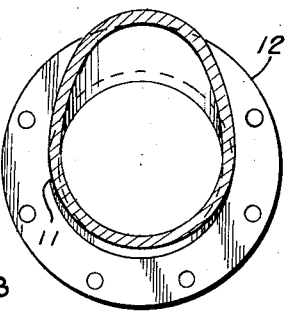
Fig. 5 is a transverse vertical section in the plane of line V—V of Fig. 1.

In the drawings, 2 is a casing of generally cylindrical form and formed as an integral casting with a bottom 3, side wall 4 and a top flange 5. On the bottom 3 there is a central boss 6 that projects up into the casing. There is also a vertical wall 7 projecting up from the bottom plate generally concentric about the boss 6, but which has two wing portions 8 (see Fig. 2) that extend from the wall 7 to the casing wall 2. The space within the wall 7 is a water outlet chamber and the space between the wings 8 is an outlet passage. This space is longer in a horizontal direction than it is high, being almost twice as long as it is wide. The top of the outlet passage is formed by a horizontal partition 8a that connects the tops of the two wings.

The casing has an outlet connection 9 formed thereon projecting from the sides of the casing around the outlet passage, this connection being of a generally oval form at the sides of the casing and changing to a round form at its outer end, the outer end having a flange 10 to enable it to be bolted to a flanged pipe (not shown).

Opposite the outlet connection is a water inlet connection 11 having a flange 12 at its outer end, this end being circular and having its center in line with the center of the outer end of the outlet connection. The inlet connection changes in cross section from a circular shape inwardly to a vertically elongated ellipse or oval, the line "A" indicating the vertical dimension of the inlet where it opens into the casing. Thus while the outlet connection narrows vertically and increases horizontally in dimension from its outer end toward the casing, the inlet connection changes from a circle at its outer end to a vertically elongated ellipse at its inner end. The significance of this will be hereinafter pointed out.

At the top of the casing is a cover 13 having a downwardly-projecting central boss 14, the cover having a water-tight fit on the casing and being removably held in place by bolts passing through the flange 5 at suitable intervals, as shown.

The upwardly-extending boss 6 on the bottom 3 and downwardly-projecting boss 14 on the cover 13 are each drilled to receive a drum-carrying shaft 15, and in addition they are counterbored from the outer face inwardy to provide packing glands 17 and 18 respectively. Gland members 19 and 20 respectively are provided for compressing of the packing. These are accessible from the exterior of the strainer.

Secured to the bottom of the casing below the boss 6 is a thrust bearing assembly 21, and the shaft 15 projects though the bottom of the casing and is engaged in this thrust bearing. The thrust bearing assembly is removably bolted to the bottom of the casing by bolts 22 and limited vertical adjustment of the thrust bearing is provided by the screw 23 which also carries a lock nut as shown. The upper end of the shaft projects above the cover of the casing and the cover is provided with an integral support 24. This support provides a mounting for the drive for the shaft which is here shown as comprising a motor 25 and a train of reducing gears which drive the shaft 15 through a gear 26 attached to the top of the shaft.

Within the casing and concentric therewith but spaced therefrom is the strainer drum 27 which is shown as being cylindrical, but which in some cases may advantageously be of an inverted frusto-conical shape as shown in the Kinney patent above referred to. The periphery of the drum is provided over its entire extent with holes 28 in which are straining elements 29 of any known or preferred construction, such for example as those disclosed in the Kinney patent above referred to. These elements are commonly mounted in the drum so as to be replaceable. In the drawings to clarify illustration, we have shown only a relatively few of these strainers which, however, are arranged in staggered relation over the major portion of the area of the drum. The lower end of the drum projects into the upper portion 7a of the partition 7 and has a close working fit therein. The portion 7a of the partition 7 may have an annular channel thereon in which are packing elements of rubber or bronze, these being designated 30. This is shown in detail in Fig. 4.

At the very top of the drum there is an end wall 31, the center of which is recessed to fit or nest about the boss 14 with sufficient clearance so as to provide for the circulation of water and the flushing out of sediment. This recessed portion is designated 32, and at the center is a hub 33 which is keyed to the shaft 15 intermediate the top and bottom of the drum. Because of the recessed arrangement of the top of the drum the hub 33 extends well down into the drum and the drum is supported on the shaft intermediate its top and bottom so that no spider or other support for the drum is needed at the lower end of the drum. The arrangement of the bosses 6 and 14 projecting as they do toward each other substantially reduce the unsupported span of the shaft 15 within the strainer so that a lighter shaft may be used than would be the case if the packing glands were constructed on the outer faces of the top and bottom of the strainer.

Figures 1, 4:
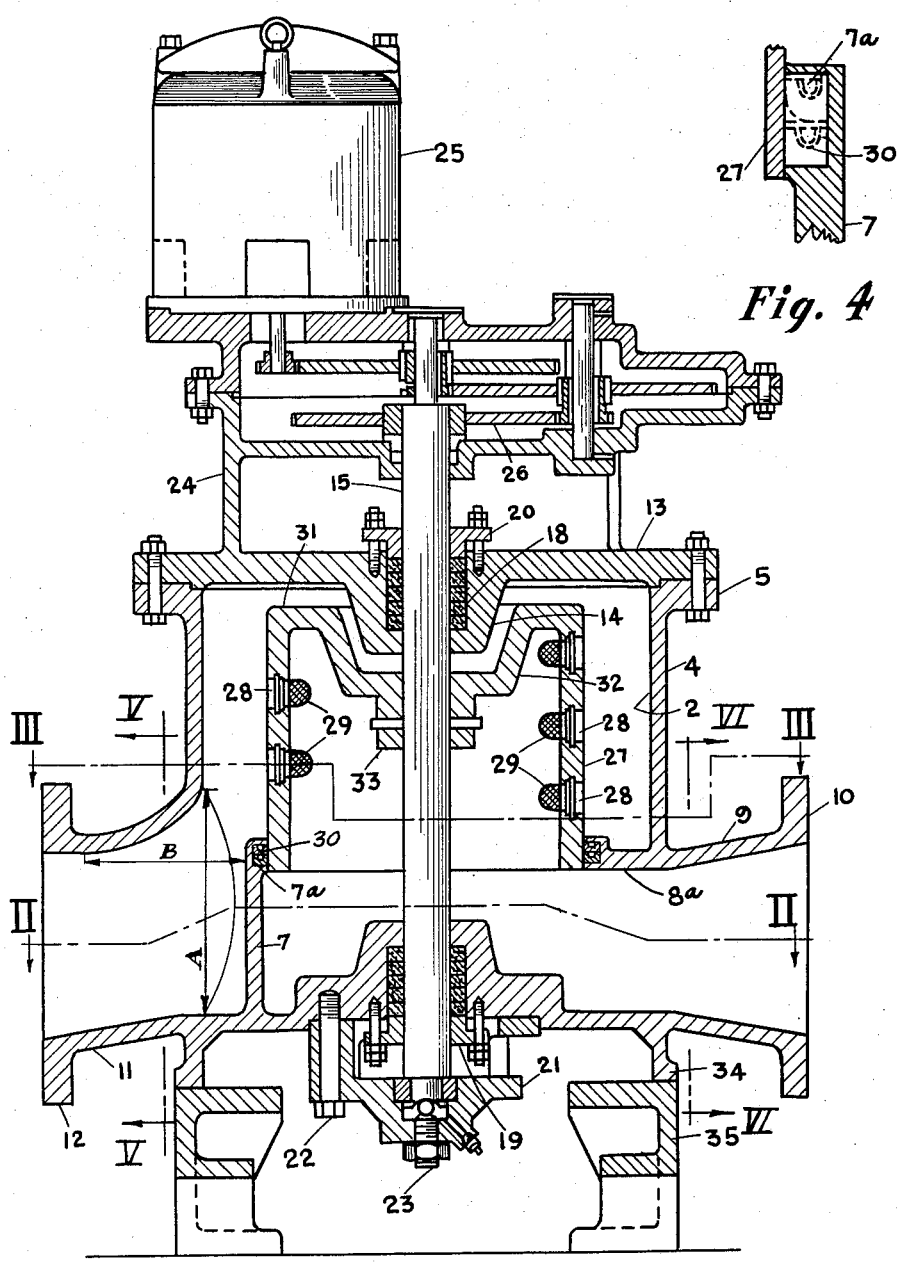
Fig. 1 is a vertical section through a strainer embodying our invention.
Fig. 4 is a fragmentary view in vertical section of a seal at the bottom of the drum.

The arrangement of the strainer is such that by reason of the elliptical shapes of the inlet and outlet passages, and the recessed top on the drum and the inwardly-projecting bosses 6 and 14 to bring the packing boxes closer together, the overall height of a strainer of any particular capacity is very substantially reduced over constructions previously provided, but at the same time the pressure drop between the inlet and outlet connections is not increased. It will be seen, for example, by reference to the horizontal arrow "B" in Fig. 1, the inlet passage for the water starts to open vertically at the level of the top of the partition 7. It will further be seen that if it were not for this elliptical shape, and if the inlet connection came straight in as in constructions heretofore provided, the flow of water would be restricted, increasing the pressure drop through the strainer. It will also be seen that by having the outlet passage in the shape of a horizontally-elongated ellipse, the partition 7 can be of less vertical height without restricting the capacity of the outlet passage. Also, because of the lower height of the partition 7 the inlet opening can extend well above the top of the partition 7, and hence well above the bottom of the drum. By reason of the shapes of the inlet and outlet connections the same volume of water can be accommodated as with conventional strainers, but the overall height of the strainer can be substantially reduced, effecting a great saving in the amount of metal or the weight of metal without any sacrifice of performance. An additional shortening the height is obtained as above indicated by the disposition of the packings in the inwardly-projecting bosses. The effective area of the drum, however, is not diminished because as shown in Fig. 1 the uppermost screen elements are above the downwardly-extending part 32 of the top and no screen area is lost by the shortening of the height of the casing or the distance between bearings. An additional advantage is gained by having a shaft extend through the casing with bearings and packing accessible at the outside of the casing and with a drive above the cover for rotating the shaft rather than the arrangement heretofore usually provided of providing a gear ring at the top of the drum with a pinion inside the casing to mesh with the gear ring, as disclosed for example in the aforesaid Kinney patent.

Figure 3:
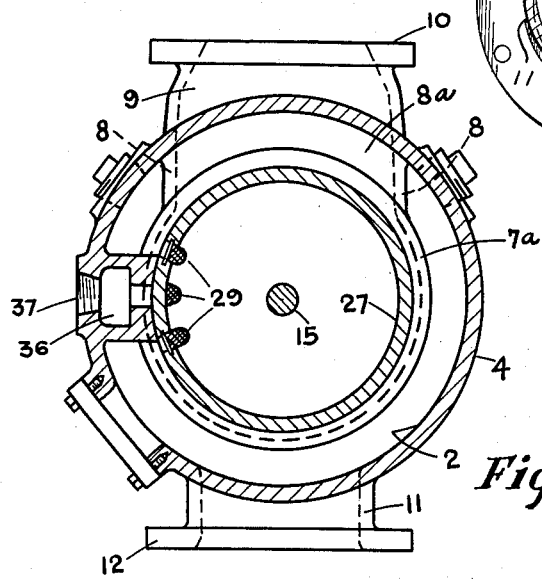
Fig. 3 is a similar section in the plane of line III—III of Fig. 1.
Figure 6:
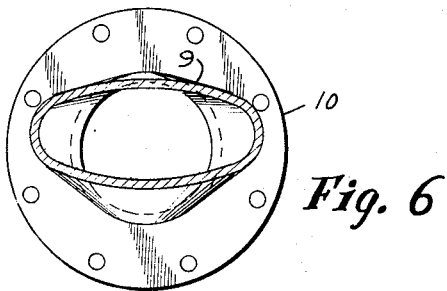
Fig. 6 is a transverse vertical section in the plane of line VI—VI of Fig. 1.

For access to the interior the strainer it is merely necessary to loosen the cover 13 and lift the drive and the cover and the drum out of the casing as a unit. The backwash shoe is designated 36 (see Fig. 3) and is of usual construction leading to an outlet 37.

In the drawings we have shown the outside of the bottom 3 of the casing as being provided with an annular flange 34 by means of which the casing may be set on casting 35 or other foundation which need be only of sufficient height to give clearance for the thrust bearing above the floor, and which will provide access to the thrust bearing and the gland elements for adjusting the same.

We claim:

1. A rotary strainer of the type having a casing with a drum positioned inside it on a vertical shaft, the drum having strainer media through the periphery thereof and having a closed upper end and an open bottom end, the drum being spaced from the wall of the casing to provide a water-circulating space thereabout, the casing having a bottom with a vertical partition wall structure on the interior of the bottom concentric about the lower end of the drum in which the lower end of the drum has a working fit, said vertical partition wall structure defining an outlet chamber at the bottom of the drum, said strainer having an outlet passage of horizontally elongated section leading from the outlet chamber horizontally to the casing, an outlet connection projecting from the casing forming a continuation of the outlet passage and being of horizontally elliptical section at its inner end and circular in section at its outer end, an inlet connection on the casing diametrically opposite the outlet connection, said inlet connection being circular in section at its outer end and of vertically-elongated elliptical section where it opens into the casing, the top of the ellipse extending above the top edge of said vertical wall and providing an upwardly and inwardly directed passage for water from the inlet into the space around the drum, the bottom of the ellipse being flush with the bottom of the casing, the outer ends of the outlet and inlet connections being concentric about an axis passing diametrically through the casing, both connections having their openings at the outer ends thereof below the bottom of the casing with interior walls sloping upwardly to merge into the bottom, the top of the outlet passage at its inner end being below the top of the inlet passage of its outer end.

2. A revolving vertical drum strainer comprising a drum having strainers in the periphery thereof, an end closure at the top of the drum with a recessed central area having a hub at the center intermediate the top and bottom of the drum, a shaft passing through the hub and secured thereto, a casing surrounding the drum and spaced therefrom, a cover plate on the casing through which the shaft extends, the cover plate having a downwardly-extending projection about the shaft nested into the recess in the end closure of the drum, a packing gland for the shaft accessible from the outside of the cover and contained within said downwardly-extending projection on the cover, driving means for the shaft mounted on the cover, a bottom for the casing, said bottom having an upwardly-extending boss inside the casing through which the bottom of the shaft passes and in which there is a packing gland for the shaft accessible at the outside of the bottom of the casing, a thrust bearing for the shaft secured to the outside of the casing below said last-named gland, a partition structure extending upwardly from the bottom providing a seal around the lower end of the drum and forming a water outlet enclosure into which the lower end of the drum opens, said partition including a partially cylindrical wall having two generally vertical wings equidistantly spaced from the vertical center plane with which they are generally parallel extending from the partition to the casing and providing between them a horizontally elongated outlet passage, there being a horizontal partition connecting the tops of the wings at the level of the bottom of the drum and forming the top of said passage, a water outlet connection on the casing projecting laterally from the casing and forming a continuation of the outlet passage, said connection being of horizontally-elongated elliptical section at the point where it joins the casing with the top of the oval substantially flush with the bottom of the drum and flush with the horizontal partition, the outlet connection being circular in section at its outer end, a water inlet connection projecting from the casing opposite the outlet connection and being of vertically-elongated elliptical section where it enters the casing with the top of the ellipse being above the bottom of the drum and above the top of said partition, the outer end of the inlet connection being circular and concentric with the outer end of the outlet connection, the horizontally elongated outlet passage within the casing having its top at a level below the top of the outer end of the inlet connection.

References Cited in the file of this patent

UNITED STATES PATENTS

| | | |
|---|---|---|
| 2,253,692 | De Grave | Aug. 26, 1941 |
| 2,371,760 | Kinney | Mar. 20, 1945 |

FOREIGN PATENTS

| | | |
|---|---|---|
| 165,765 | Austria | Apr. 25, 1950 |